United States Patent
Künstle et al.

(10) Patent No.: US 10,457,827 B2
(45) Date of Patent: Oct. 29, 2019

(54) AQUEOUS, POLYVINYL ALCOHOL STABILIZED VINYL ACETATE-ETHYLENE-COPOLYMER DISPERSION HAVING HIGH FILLER COMPATIBILITY FOR CARPET COATING COMPOSITIONS

(71) Applicant: WACKER CHEMIE AG, München (DE)

(72) Inventors: Holger Künstle, Burghausen (DE); Timo Melchin, Mehring (DE); Robert Tangelder, Laren (NL)

(73) Assignee: Wacker Chemie AG, Munich (DE)

( * ) Notice: Subject to any disclaimer, the term of this patent is extended or adjusted under 35 U.S.C. 154(b) by 262 days.

(21) Appl. No.: 15/328,129

(22) PCT Filed: Jul. 1, 2015

(86) PCT No.: PCT/EP2015/064962
§ 371 (c)(1),
(2) Date: Jan. 23, 2017

(87) PCT Pub. No.: WO2016/012209
PCT Pub. Date: Jan. 28, 2016

(65) Prior Publication Data
US 2017/0253759 A1    Sep. 7, 2017

(30) Foreign Application Priority Data

Jul. 24, 2014   (DE) .................. 10 2014 214 472

(51) Int. Cl.
| | | |
|---|---|---|
| C09D 123/08 | (2006.01) | |
| C09J 131/04 | (2006.01) | |
| D06N 7/00 | (2006.01) | |
| C09J 123/08 | (2006.01) | |
| C08K 3/26 | (2006.01) | |
| C08L 29/04 | (2006.01) | |

(52) U.S. Cl.
CPC .......... C09D 123/0853 (2013.01); C08K 3/26 (2013.01); C08L 29/04 (2013.01); C09J 123/0853 (2013.01); C09J 131/04 (2013.01); D06N 7/0071 (2013.01); D06N 7/0086 (2013.01); C08K 2003/265 (2013.01); C09J 2203/314 (2013.01); C09J 2205/114 (2013.01); C09J 2423/04 (2013.01); C09J 2429/00 (2013.01); D06N 2201/0254 (2013.01); D06N 2203/042 (2013.01); D06N 2203/045 (2013.01); D06N 2205/04 (2013.01); D06N 2205/14 (2013.01); D06N 2213/065 (2013.01)

(58) Field of Classification Search
USPC ....... 442/149, 150, 151; 428/96, 97; 156/72; 524/503
See application file for complete search history.

(56) References Cited

U.S. PATENT DOCUMENTS

| | | |
|---|---|---|
| 3,779,799 A | 12/1973 | Dodds |
| 4,239,563 A | 12/1980 | Iacoviello |
| 4,735,986 A | 4/1988 | Iacoviello |
| 4,921,898 A | 5/1990 | Lenney |
| 5,026,765 A | 6/1991 | Katz |
| 6,359,076 B1 | 3/2002 | Leighton |
| 6,576,698 B1 | 6/2003 | Weitzel |
| 2002/0035193 A1 | 3/2002 | Weitzel |
| 2002/0165341 A1 | 11/2002 | Weitzel |
| 2007/0112128 A1* | 5/2007 | Weitzel ............... C04B 24/2623 524/557 |
| 2012/0009379 A1 | 1/2012 | Wormald |

FOREIGN PATENT DOCUMENTS

| | | |
|---|---|---|
| EP | 1110978 A1 | 6/2001 |
| EP | 1174447 A1 | 1/2002 |
| EP | 1215218 A1 | 6/2002 |
| GB | 1298155 A | 11/1972 |
| WO | 9000967 A1 | 2/1990 |
| WO | 9910396 A1 | 3/1999 |
| WO | 06007157 A1 | 1/2006 |
| WO | 10089142 A1 | 8/2010 |
| WO | 11139267 A1 | 11/2011 |
| WO | 11140065 A2 | 11/2011 |
| WO | 12020319 A2 | 2/2012 |
| WO | 12020321 A2 | 2/2012 |
| WO | 13001379 A2 | 1/2013 |
| WO | 13093547 A1 | 6/2013 |
| WO | 13123210 A1 | 8/2013 |
| WO | 14031579 A2 | 2/2014 |

OTHER PUBLICATIONS

International Search Report for Application PCT/EP2015/064962, dated Sep. 21, 2015, 3 pages.

* cited by examiner

Primary Examiner — Lynda Salvatore
(74) Attorney, Agent, or Firm — RatnerPrestia

(57) ABSTRACT

The invention relates to an aqueous vinyl acetate-ethylene-copolymer dispersion for carpet coating compositions, which is obtained by means of radical-initiated emulsion polymerization, in an aqueous medium, of vinyl acetate and ethylene and optionally additional ethylenically unsaturated comonomers, characterized in that, for stabilization of the dispersion, 5 to 10 wt %, based on the total weight of the comonomers, of one or a plurality of partially saponified and low-molecular polyvinyl alcohols having a hydrolysis degree of 80 to 95 mol % and a Höppler viscosity, in 4% aqueous solution, of 1 to 5 mPas (method according to Höppler at 20° C., DIN 53015) are contained.

11 Claims, No Drawings

AQUEOUS, POLYVINYL ALCOHOL STABILIZED VINYL ACETATE-ETHYLENE-COPOLYMER DISPERSION HAVING HIGH FILLER COMPATIBILITY FOR CARPET COATING COMPOSITIONS

CROSS-REFERENCE TO RELATED APPLICATIONS

This application is the U.S. National stage filing of International Application No. PCT/EP2015/064962, filed 1 Jul. 2015, and claims priority of German application number 10 2014 214 472.8, filed 24 Jul. 2014, the entireties of which applications are incorporated herein by reference.

FIELD OF THE INVENTION

The invention relates to a polyvinyl alcohol-stabilized aqueous vinyl acetate-ethylene copolymer dispersion of high filler compatibility, and also to a carpet coating composition for consolidating carpets which contains such a vinyl acetate-ethylene copolymer dispersion of high filler compatibility, and also to carpets coated with such a vinyl acetate-ethylene copolymer dispersion of high filler compatibility.

BACKGROUND OF THE INVENTION

Carpets, for example continuous-sheeting product or carpet tiles, are manufactured by forming the carpet pile from tufts inserted, for example in the form of loops, into a woven or non-woven primary backing. In tufted carpet, the sheetlike primary backing holds the loops but loosely. Needlefelt carpets are manufactured by needling the tufts. In woven carpets, the tufts are interwoven with the primary backing.

To improve the attachment of the carpet pile to the sheetlike primary backing, a binder is applied to the reverse side of the primary backing. Aqueous types of polymer dispersions filled with fillers, for example chalk, may contain further additives such as thickeners and are generally precoated as a foam or in the unfoamed state.

It is particularly for the purpose of improving the dimensional stability of carpets that they are provided a further, secondary backing. The secondary backing generally comprises a woven fabric in a manufactured fiber such as polypropylene or in a natural fiber such as jute. The secondary backing is attached to the as-precoated carpet by further applying a binder. Again, aqueous types of polymer dispersions filled with fillers, for example chalk, may contain further additives such as thickeners and are generally applied as a foam or in the unfoamed state to form a secondary coating.

WO 90/00967 A1 describes the use of aqueous dispersions of vinyl acetate-ethylene copolymers or of styrene-butadiene copolymers or of styrene-acrylate copolymers instead of PVC plastisol as binders in carpet manufacture.

U.S. Pat. No. 3,779,799 describes a tufted carpet precoated with a binder composition where the binder is a vinyl acetate-ethylene copolymer dispersion (VAE copolymer dispersion) or a polyethylene dispersion or a dispersion of a carboxylated styrene-butadiene copolymer.

U.S. Pat. No. 5,026,765 describes a carpet coating composition comprising a vinyl acetate-ethylene copolymer dispersion wherein the copolymer further contains monomer units whose homopolymers have a Tg of at least 50° C.

U.K. patent GB 1,298,155 describes carpet coating compositions comprising a crosslinkable binder based on an aqueous mixture of vinyl acetate-ethylene copolymer, polyvinyl alcohol (PVOH) and glyoxal.

WO 2010/089142 A1 discloses a vinyl acetate-ethylene copolymer dispersion employed as a binder in carpet manufacture. The copolymer contains just 1 to 4 wt % of ethylene and is emulsifier stabilized only, although small amounts of protective colloid may be co-used for stabilization if necessary.

To improve adherence to polyvinyl butyral sheeting (as secondary backing), WO 2006/007157 A1 proposes employing a vinyl acetate-ethylene copolymer further comprising from 1 to 10 wt % of comonomer units containing functional groups such as carboxyl, amide, N-methylol or hydroxyalkyl groups. The copolymer is prepared by employing a mixture of emulsifier and from 0.05 to 4 wt % of protective colloid.

U.S. Pat. No. 6,359,076 proposes improving the water resistance of carpet coatings by employing crosslinkable vinyl acetate-ethylene copolymers which include OH-functional monomer units in combination with a crosslinker.

WO 2011/139267 A1 and WO 2011/140065 A2 propose improving the quality of carpet coatings based on vinyl acetate-ethylene copolymers by eschewing stabilization with protective colloid, emulsifier stabilizing only and copolymerizing functional crosslinkable comonomers such as silane-functional or multifunctional comonomers.

WO 2012/020319 A2 or WO 2012/020321 A2 discloses carpets notable for low flammability or good washability. The binder used was a vinyl acetate-ethylene copolymer dispersion having an average particle size dw of 50 to 500 nm, prepared by emulsifier stabilization, although up to 3% of protective colloid may additionally be used as a costabilizer if necessary.

WO 2013/093547 A2 relates to a carpet binder having an optimized composition for formulations with carbon black as a filler. The binder comprises a vinyl acetate-ethylene copolymer dispersion stabilized with emulsifier and cellulose ether.

WO 2013/123210 A1 relates to carpets manufactured by employing a binder mixture formed from a vinyl acetate-ethylene copolymer dispersion and from a styrene-butadiene copolymer dispersion. A proposal to improve the compatibility of the two different polymer dispersions involves eschewing polyvinyl alcohol in the VAE dispersion, and at most employing up to 1.5 wt % of polyvinyl alcohol, based on comonomers, as a protective colloid in the preparation thereof.

WO 2014/031579 A2 relates to a carpet coating composition which by way of binders may include inter alia a VAE dispersion which is emulsifier stabilized and may additionally contain up to 1.5 wt % of polyvinyl alcohol as a costabilizer if necessary. This dispersion is blended with an alpha-olefin-carboxylic acid copolymer and a crosslinker.

WO 99/10396 A1 proposes improving the rheology of VAE dispersions having a high solids content of at least 65 wt % by preparing them in the presence of a stabilizer mixture formed of more than 3 wt %, preferably 4 to 5 wt % of low molecular weight polyvinyl alcohol and 1 to 4 wt % of a nonionic emulsifier having a defined HLB.

WO 2013/001379 A2 describes polyvinyl alcohol-stabilized VAE dispersions. To optimize their viscosity, the stabilizing polyvinyl alcohol used comprises a mixture of 0.5 to 3 wt % of fully hydrolyzed polyvinyl alcohol and 1.5 to 4 wt % of partially hydrolyzed polyvinyl alcohol.

U.S. Pat. No. 4,921,898 relates to aqueous adhesive compositions based on a vinyl acetate-ethylene copolymer dispersion prepared in the presence of a stabilizer combination of 2 to 4 wt % of a low molecular weight polyvinyl alcohol with 2 to 4 wt % of an emulsifier. The adhesive composition is notable for rapid setting.

U.S. Pat. No. 4,239,563 describes aqueous vinyl acetate-ethylene copolymer dispersions useful as binders for consolidating carpets. The lower emission of volatile organic compounds (VOCs) versus styrene-butadiene latices is emphasized. The VAE dispersion is prepared via emulsion polymerization by use of emulsifier and/or protective colloid (inter alia polyvinyl alcohol). The VAE copolymer has a high ethylene content of 30 to 80 wt %, based on total comonomers.

U.S. Pat. No. 4,735,986 by way of prior art for carpet binders describes a composition comprising a vinyl acetate-ethylene copolymer dispersion stabilized with 5 wt % of polyvinyl alcohol, wherein the polyvinyl alcohol fraction comprises a mixture of a low-viscosity partially hydrolyzed PVOH and a medium-viscosity partially hydrolyzed PVOH. Disadvantages are stated to be an insufficient level of filler compatibility, the lack of compatibility with chalks of differing specification and the low compatibility with styrene-butadiene copolymer dispersions. The property profile is said to be improved on polymerizing in the presence of a stabilizer mixture of partially hydrolyzed PVOH, fully hydrolyzed PVOH and a nonionic polyalkoxylated emulsifier.

The disadvantage with the solely polyvinyl alcohol-stabilized vinyl acetate-ethylene copolymer dispersions hitherto used as binders in carpet coating compositions is their inadequacy in filler compatibility, for example with chalk, in highly filled formulations. True, the co-use of emulsifiers during the polymerization or the subsequent admixture of emulsifiers does improve the filler compatibility of an aqueous vinyl acetate-ethylene copolymer dispersion, yet the admixture of emulsifiers also degrades the mechanical properties of the coating obtained therewith.

SUMMARY OF THE INVENTION

The problem addressed by the present invention was therefore that of providing a polyvinyl alcohol-stabilized aqueous vinyl acetate-ethylene copolymer dispersion which, when used as a binder in carpet coating compositions, is processable even with large amounts of fillers (up to 1400 wt % of filler based on VAE copolymer dry/dry), and leads to high mechanical strengths whether used in the precoat or in the secondary coating.

The invention provides an aqueous vinyl acetate-ethylene copolymer dispersion for carpet coating compositions which is obtained via free-radically initiated emulsion polymerization, in an aqueous medium, of vinyl acetate and ethylene and optionally further ethylenically unsaturated comonomers, characterized in that the dispersion comprises a stabilizing system comprising from 5 to 10 wt %, based on total comonomers, of one or more, partially hydrolyzed and low molecular weight polyvinyl alcohols having a hydrolysis degree of respectively 80 to 95 mol % and a Hoeppler viscosity, in 4% aqueous solution, of respectively 1 to 5 mPas (DIN 53015 Hoeppler method at 20° C.).

DETAILED DESCRIPTION OF THE INVENTION

This aqueous vinyl acetate-ethylene copolymer dispersion is notable for high filler compatibility. High filler compatibility is to be understood as meaning that these aqueous vinyl acetate-ethylene copolymer dispersions provide carpet coating compositions combining fill levels of 600 wt % to 1400 wt % of filler based on VAE copolymer (dry/dry) and a solids content of 75 to 85 wt %, prior to a thickening agent being admixed, with a Brookfield RV viscosity of ≤3000 mPas (measured with Brookfield RV measuring instrument using spindle 4, 20 rpm, at 25° C.).

When the viscosity of a carpet coating composition before admixing the thickening agent is higher, the incorporation times for the filler are unacceptably long on an industrial scale, and there is a risk of undispersed clumps of filler that are able to destroy the carpet fabric.

Vinyl acetate is generally copolymerized in an amount of 65 to 99 wt %, preferably 80 to 95 wt %, all based on total monomers. Ethylene is generally copolymerized in an amount of 1 to 30 wt %, preferably 5 to 20 wt %, all based on total monomers. An additional up to 10 wt %, preferably 0.1 to 10 wt %, all based on total monomers, is optionally copolymerizable of yet further comonomers. The wt % ages for the comonomers add up to 100 wt % in each case.

Suitable further comonomers are comonomers from the group of vinyl esters having 3 to 12 carbon atoms in the carboxylic acid moiety such as vinyl propionate, vinyl laurate, vinyl esters of alpha-branched carboxylic acids having 9 to 11 carbon atoms such as VeoVa$^R$9, VeoVa$^R$10, VeoVa$^R$11. Also suitable are methacrylic or acrylic esters of branched or unbranched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Vinyl halides such as vinyl chloride are also suitable.

Suitable further comonomers also include ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric and maleic acid such as the diethyl and diisopropyl esters, and also maleic anhydride, ethylenically unsaturated sulfonic acids and/or salts, preferably vinylsulfonic acid, 2-acrylamido-2-methylpropanesulfonic acid. Further examples are precrosslinking comonomers such as polyethylenically unsaturated comonomers, examples being divinyl adipate, diallyl maleate, allyl methacrylate or triallyl cyanurate, or postcrosslinking comonomers, examples being acrylamidoglycolic acid (AGA), methylacrylamidoglycolic methyl ester (MAGME), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate.

Also suitable are monomers having hydroxyl or carboxyl groups, examples being hydroxyalkyl esters of methacrylic acid and of acrylic acid such as hydroxyethyl acrylate, hydroxyethyl methacrylate, hydroxypropyl acrylate, hydroxypropyl methacrylate, hydroxybutyl acrylate or hydroxybutyl methacrylate, and also 1,3-dicarbonyl compounds such as acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate and allyl acetoacetate.

Suitable further comonomers also include epoxide-functional comonomers such as glycidyl methacrylate, glycidyl acrylate, allyl glycidyl ether, vinyl glycidyl ether. Further examples of suitable further comonomers are silicon-functional comonomers, such as acryloyloxypropyltri(alkoxy)- and methacryloyloxypropyltri(alkoxy)silanes, vinyltrialkoxysilanes and vinylmethyldialkoxysilanes, preferably with alkyl and/or alkoxy groups each having 1 or 2 carbon atoms, examples being vinyltrimethoxysilane, vinyltriethoxysilane, 3-methacryloyloxypropyltrimethoxysilane.

The vinyl acetate-ethylene copolymer dispersion is prepared by the emulsion polymerization process, wherein the polymerization temperature is generally in the range from 40° C. to 120° C., and preferably in the range from 60° C. to 90° C. and the pressure employed is generally in the range from 5 to 100 bar abs. The polymerization is preferably initiated using the redox initiator combinations customary for an emulsion polymerization. Examples of suitable oxidation initiators are the sodium, potassium and ammonium salts of peroxodisulfuric acid, hydrogen peroxide, t-butyl peroxide, t-butyl hydroperoxide, potassium peroxodiphosphate, t-butyl peroxopivalate, cumene hydroperoxide, isopropylbenzene monohydroperoxide, azobisisobutyronitrile. Preference is given to the sodium, potassium and ammonium salts of peroxodisulfuric acid and to hydrogen peroxide. The recited initiators are generally used in an amount of 0.01 to 2.0 wt %, based on total monomers. Suitable reducing agents are the sulfites and bisulfites of the alkali metals and of ammonium, examples being sodium sulfite, the derivatives of sulfoxylic acid such as zinc formaldehydesulfoxylate or alkali metal formaldehydesulfoxylates, examples being sodium hydroxymethanesulfinate (Brüggolit) and (iso)ascorbic acid. Sodium hydroxymethanesulfinate and sodium sulfite are employed with preference. The amount of reducing agent is preferably in the range from 0.015 to 3 wt %, based on total monomers. The recited oxidizing agents, in particular the salts of peroxodisulfuric acid, are also employable on their own as thermal initiators.

The polymerization is carried out in the presence of 2 to 10 wt %, based on total comonomers, of one or more partially hydrolyzed and low molecular weight polyvinyl alcohols having a hydrolysis degree of respectively 80 to 95 mol % and a Hoeppler viscosity, in 4% aqueous solution, of respectively 1 to 5 mPas (DIN 53015 Hoeppler method at 20° C.). It is preferable to employ from 6 to 10 wt %, more preferably from 6 to 8 wt %, all based on total comonomers, of one or more partially hydrolyzed and low molecular weight polyvinyl alcohols. The degree of hydrolysis of the partially hydrolyzed and low molecular weight polyvinyl alcohols is preferably in the range from 85 to 90 mol %, and more preferably in the range from 87 to 89 mol %. The Hoeppler viscosity in 4% aqueous solution of the partially hydrolyzed and low molecular weight polyvinyl alcohols is preferably in the range from 2 to 5 mPas (DIN 53015 Hoeppler method at 20° C.). The recited polyvinyl alcohols are commercially available and they are obtainable via methods known to a person skilled in the art.

It is optionally also possible to use partially hydrolyzed and high molecular weight polyvinyl alcohols having a hydrolysis degree of preferably 80 to 95 mol % and a Hoeppler viscosity in 4% aqueous solution of preferably 8 to 40 mPas (DIN 53015 Hoeppler method at 20° C.) in admixture with the partially hydrolyzed and low molecular weight polyvinyl alcohols. It is optionally also possible for fully hydrolyzed and high molecular weight polyvinyl alcohols having a hydrolysis degree of preferably 98 to 100 mol % and a Hoeppler viscosity in 4% aqueous solution of preferably 10 to 56 mPas (DIN 53015 Hoeppler method at 20° C.) to be used in admixture with the partially hydrolyzed and low molecular weight polyvinyl alcohols. The partially hydrolyzed and high molecular weight polyvinyl alcohols and/or the fully hydrolyzed and high molecular weight polyvinyl alcohols are employable in admixture, preferably each in an amount of 0 to 2 wt %, both based on total comonomers.

Optionally, small amounts of emulsifiers are additionally usable in the polymerization, for example at from 0.1 to 2.0 wt %, based on total comonomers. Preferably, no emulsifiers are used during the polymerization nor are any emulsifiers admixed subsequently.

The polyvinyl alcohol fraction is wholly included in the initial charge prior to the polymerization, or wholly added during the polymerization, or partly included in the initial charge and partly added. The polyvinyl alcohol fraction may also be admixed partly before or during the polymerization and the balance admixed subsequently after completion of the polymerization, subject to the proviso that the proportion admixed before or during the polymerization is at least 2 wt %, preferably at least 5 wt %, both based on total comonomers.

The polymerization is performable in a batch process, in a semibatch process or in a continuous process. The monomers in question are wholly chargeable initially, wholly addable or initially chargeable in proportions with the balance being added after the polymerization has been initiated. The add feeds may be separate (spatially and temporally), or all or some of the components to be added may be added after pre-emulsification.

The polymerization is generally carried on to a conversion of ≥95 wt %, preferably up to a conversion of 95 to 99 wt %, of the monomers which are liquid under polymerization conditions. The polymerization mixture is subsequently let down to a pressure of 0.1 to 5.0 bar abs., preferably 0.1 to 1.0 bar abs.

The aqueous vinyl acetate-ethylene copolymer dispersions thus obtainable have a solids content of 30 to 75 wt %, preferably of 50 to 65 wt %.

The invention further provides a carpet coating composition for consolidating carpets (for example continuous sheet products or carpet tiles) which comprises the polyvinyl alcohol-stabilized aqueous vinyl acetate-ethylene copolymer dispersion according to the invention, and from 100 to 1400 wt % of filler, based on the vinyl acetate-ethylene copolymer (solids/solids). The solids content of the carpet coating composition is preferably in the range from 72 to 83 wt % and more preferably in the range from 75 to 80 wt %, all based on the total weight of the carpet coating composition. The carpet coating composition is notable for a Brookfield RV viscosity of ≤3000 mPas (measured with Brookfield RV measuring instrument using spindle 4, 20 rpm, at 25° C.) before admixture of thickening agent.

The carpet coating compositions contain a filler as well as the aqueous vinyl acetate-ethylene copolymer dispersion. Suitable fillers are known to a person skilled in the art, examples being chalk, kaolin, talc, fluorite, fly ash, aluminum trihydrate. Chalk is preferably used as filler. The carpet coating composition may also contain thickening agents such as, for example, polyacrylates or cellulose ethers. Foaming auxiliaries may be admixed for foam application. Customary additives further include dispersants, wetting agents, pigments or biocides.

The carpet coating composition contains 100 to 1400 parts by weight of filler per 100 parts by weight of vinyl acetate-ethylene copolymer (dry/dry). This is also referred to as a fill level of 100% to 1400%. The amount of filler in the formulation may vary according to the coating properties desired. The higher the filler fraction (fill level), the lower the mechanical properties are.

The precoat preferably utilizes formulations having fill levels of 300 to 1400%. Fill levels are preferably in the range from 600 to 1000% for precoats for residential applications and from 300 to 600% for commercial applications (offices, hotels, ships).

The secondary coating preferably utilizes formulations with fill levels of 275 to 600% for residential applications and 200 to 275% for commercial applications (offices, hotels, ships).

In a possible procedure for producing the carpet coating composition, the vinyl acetate-ethylene copolymer dispersion is initially charged together with water and dispersant and the filler is stirred in. Using the polyvinyl alcohol-stabilized aqueous vinyl acetate-ethylene copolymer dispersion of the invention for this provides a composition having a Brookfield RV viscosity of ≤3000 mPas (measured with Brookfield RV measuring instrument using spindle 4, 20 rpm, at 25° C.). To establish the target viscosity, thickening agent may then be admixed. An amount of 0.1 to 3 wt %, based on the vinyl acetate-ethylene copolymer dispersion, is generally sufficient for this. The thickening agent is preferably used to establish a Brookfield RV viscosity (measured with Brookfield RV measuring instrument using spindle 4, 20 rpm, at 25° C.) of 2000 to 10 000 mPas.

The invention further provides carpets coated with a carpet coating composition of the present invention, comprising the vinyl acetate-ethylene copolymer dispersion, in the precoat and/or secondary coating.

The carpet coating composition is useful in the manufacture of tufted carpets, woven carpets or needlefelt carpets, for which the carpet coating composition is employable using existing processes in existing equipment for carpet manufacture.

The examples which follow illustrate the invention:

Example 1: (In Accordance with the Present Invention)

(Preparation of Aqueous Vinyl Acetate-Ethylene Copolymer Dispersion of High Filler Compatibility)

A pressure reactor (capacity: 570 liters) was initially charged with 130 kg of a 10 wt % aqueous polyvinyl alcohol solution of a polyvinyl alcohol, having a Hoeppler viscosity of 4 mPas in a 4 wt % solution, and an 88 mol % degree of hydrolysis. The initial charge additionally included 224 kg of vinyl acetate and 101.5 kg of deionized water. The reactor was brought to a pressure of 21 bar and a temperature of 55° C. (corresponding to an ethylene quantity of 18.5 kg) and the polymerization was started by starting the initiator feeds of tert-butyl hydroperoxide (3 wt % in water) and ascorbic acid (5 wt % in water), each at 750 g/h. At the onset of reaction, apparent from the temperature increase, the reaction temperature was raised to 90° C. by the evolving heat of polymerization and the pressure was raised to 44 bar. The initiator feeds were each reduced to 350 g/h. Further feeds were started 45 minutes after onset of the reaction: 40 kg/h of vinyl acetate for a period of 90 minutes (corresponding to 60 kg of vinyl acetate) and 30 kg/h of a 10 wt % aqueous polyvinyl alcohol solution, having a Hoeppler viscosity of 4 mPas in a 4 wt % solution, and an 88 mol % degree of hydrolysis, for a period of 120 minutes (corresponding to an amount of 60 kg). Ethylene was replenished at a target pressure of 44 bar up to a total ethylene quantity of 34 kg.

On completion of the monomer feeds, the initiator feeds were each boosted to 1300 g/h for 30 minutes, during which the pressure dropped to 20 bar (time point 1). The batch was subsequently cooled down to 65° C. and transferred into an atmospheric (low-pressure) reactor and postpolymerized there at a pressure of 700 mbar abs. by admixture of 1 kg tert-butyl hydroperoxide solution (10 wt % in water) and 2 kg of ascorbic acid solution (5 wt % in water).

The dispersion obtained had a solids content of 59 wt %, a viscosity of 1800 mPas (Brookfield, 20, 23° C.), a glass transition temperature Tg of 15.0° C. The copolymer contained 89 wt % of vinyl acetate monomer units and 11 wt % of ethylene monomer units. The polyvinyl alcohol content was 6 wt %, based on comonomers.

Example 2: (In Accordance with the Present Invention)

(Similar to Example 1 Except that Just 3 wt % of Polyvinyl Alcohol was Employed During the Polymerization, the Remaining 3 wt % being Admixed to the Polymer Dispersion after the Polymerization)

Example 1 was repeated except that only 65 kg of polyvinyl alcohol solution were initially charged instead of 130 kg and only 30 kg of polyvinyl alcohol solution were added instead of 60 kg. On completion of the polymerization, 95 kg of the polyvinyl alcohol solution were then subsequently admixed to the vinyl acetate-ethylene copolymer dispersion.

Comparative Example 3: (Not in Accordance with the Present Invention)

(Stabilization with Just 2.4 wt % of Low-Viscosity Partially Hydrolyzed Polyvinyl Alcohol and 1.8 wt % of High-Viscosity Partially Hydrolyzed Polyvinyl Alcohol)

Vinyl acetate-ethylene copolymer dispersion comprising 85 wt % of vinyl acetate units and 15 wt % of ethylene units and a mixture of 2.4 wt % of a polyvinyl alcohol having a Hoeppler viscosity of 4 mPas and an 88 mol % degree of hydrolysis and 1.8 wt % of a polyvinyl alcohol having a Hoeppler viscosity of 26 mPas and an 88 mol % degree of hydrolysis, the wt % ages each being based on total comonomers.

Comparative Example 4: (Not in Accordance with the Present Invention)

(Stabilization with Just 3.2 wt % of Low-Viscosity Partially Hydrolyzed Polyvinyl Alcohol and 1.8 wt % of Nonionic Emulsifier)

Vinyl acetate-ethylene copolymer dispersion comprising 85 wt % of vinyl acetate units and 15 wt % of ethylene units and a mixture of 3.2 wt % of a polyvinyl alcohol having a Hoeppler viscosity of 5 mPas and an 88 mol % degree of hydrolysis and 1.8 wt % of a fatty alcohol ethoxylate emulsifier, the wt % ages each being based on total comonomers.

Comparative Example 5: (Not in Accordance with the Present Invention)

(Emulsifier-Stabilized Vinyl Acetate-Ethylene Copolymer Dispersion)

Vinyl acetate-ethylene copolymer dispersion comprising 85 wt % of vinyl acetate units and 10 wt % of ethylene units, 1 wt % of acrylic acid and 2 wt % of glycidyl methacrylate (GMA) and 2 wt % of a fatty alcohol ethoxylate and 1 wt % of a mixture of anionic sulfosuccinate and alkylbenzenesulfonate emulsifiers, the wt % ages each being based on total comonomers.

Preparation of Carpet Coating Compositions:

The dispersions of Examples 1 and 2 and Comparative Examples 3 to 5 were each used to produce the following formulations:

Precoat with 1000% fill level and a solids content of 78.5 wt %:

using spindle 4, 20 rpm, at 25° C.) using a thickening agent (Matco TR 10 acrylate thickener, Matco) or via admixture of water.

The Brookfield RV viscosity prior to the thickening agent being admixed is a measure of filler compatibility. The values measured are collated in Table 1.

TABLE 1

Brookfield viscosities in mPas (RV/20 Rpm) before thickener admixture

| Dispersion | Stabilization | Precoat (1000% fill level, solids content 78.5%) | Secondary coating (400% fill level, solids content 79.5%) |
|---|---|---|---|
| Example 1 | 6 wt % of PVOH (low molecular weight, partially hydrolyzed) in polymerization | 2400 | 1950 |
| Example 2 | 6 wt % of PVOH (low molecular weight, partially hydrolyzed) (3 wt % in polymerization, 3% subsequently admixed) | 1800 | 1600 |
| Comparative Example 3 | <5 wt % of PVOH (low molecular weight, partially hydrolyzed) | 12000 | 7300 |
| Comparative Example 4 | 3.2 wt % of low-viscosity partially hydrolyzed polyvinyl alcohol and 1.8 wt % of nonionic emulsifier | 1200 | 770 |
| Comparative Example 5 | 2 wt % of nonionic emulsifier and 1 wt % of anionic emulsifier | 300 | 550 |

100 parts by weight dry of a vinyl acetate-ethylene copolymer dispersion as per Examples 1 to 2 and Comparative Examples 3 to 5, 1000 parts by weight dry of chalk (Carbocia 80, Carbocia), 2.0 parts by weight dry of a dispersant (Sokalan CP 10, BASF), 0.6 part by weight dry of a foaming auxiliary (sodium laurylsulfate, Disponil SDS, BASF), about 200 parts by weight of water to establish the solids content of 78.5 wt %.

Secondary coating with 400 wt % fill level and a solids content of 79.5 wt %:

100 parts by weight dry of a vinyl acetate-ethylene copolymer dispersion as per Examples 1 to 2 and Comparative Examples 3 to 5, 400 parts by weight dry of chalk (Carbocia 80, Carbocia), 0.8 part by weight dry of a dispersant (Sokalan CP 10, BASF), 0.5 part by weight dry of a foaming auxiliary (sodium laurylsulfate, Disponil SDS, BASF), about 30 parts by weight of water to establish the solids content of 79.5 wt %.

The water and the VAE copolymer dispersion and the dispersant were each initially charged. The filler was subsequently admixed under agitation followed by the foaming auxiliary.

The formulations were each then measured for their Brookfield viscosity (measured with Brookfield RV measuring instrument using spindle 4, 20 rpm, at 25° C.).

A final viscosity of 6000 to 7000 mPas was then established (measured with Brookfield RV measuring instrument As is clearly seen in the table, the polyvinyl alcohol-stabilized vinyl acetate-ethylene copolymer dispersion of the present invention (Examples 1 and 2) is useful to produce precoats and secondary coatings having viscosities of <3000 mPas before thickener admixture and at solids contents of 78.5% and 79.5% respectively.

This was not possible with the Comparative Example 3 polyvinyl alcohol-stabilized dispersion, which is not in accordance with the present invention.

The emulsifier-costabilized dispersion (Comparative Example 4) or the purely emulsifier-stabilized dispersion (Comparative Example 5), neither of which is in accordance with the present invention, each gave precoats having viscosities of <3000 mPas before thickener admixture.

Testing of Carpets for Tuft Withdrawal Force and Delamination Resistance:

Preparation of Carpet Coating Compositions:

The mechanical properties were evaluated by employing, on a laboratory scale, one formulation having a fill level of 450% both for precoating and for secondary coating (laboratory benchmarking).

True, in industrial practice, higher fill levels for the precoat and lower add-ons are employed, but the tuft bind strength and delamination strength values obtained in this laboratory benchmarking exercise do allow a relative comparison between the polymer dispersions used.

The dispersions of Examples 1 and 2 and Comparative Examples 3 to 5 were each used to produce the following formulations having the following recipes:

Laboratory benchmarking formulation with 450 wt % fill level and a solids content of 81.5 wt %: 100 parts by weight dry of a vinyl acetate-ethylene copolymer dispersion as per Examples 1 to 2 and Comparative Examples 3 to 5, 450 parts by weight dry of chalk (Carbocia 80, Carbocia), 0.8 part by weight dry of a dispersant (Sokalan CP 10, BASF), 0.5 part by weight dry of a foaming auxiliary (sodium laurylsulfate, Disponil SDS, BASF), about 20 parts by weight of water to establish the solids content of 81.5 wt %.

The water and the VAE copolymer dispersion and the dispersant were each initially charged. The filler was subsequently admixed under agitation followed by the foaming auxiliary.

A final viscosity of 6000 to 7000 mPas was then established (measured with Brookfield RV measuring instrument using spindle 4, 20 rpm, at 25° C.) using a thickening agent (Matco TR 10 acrylate thickener, Matco). In Comparative Example 3, the viscosity was established by diluting with water, no acrylate thickener being used.

Production of Laboratory Carpet Specimens:

The formulations for precoating and secondary coating were each frothed up (typically for about 3 minutes) in the lab, using a kitchen appliance, to foam having densities of 950 to 1015 g/L. A Helsinki style greige loop pile tufted carpet from Edel (100% polyamide; 550 g/m² pile weight) 38 cm×33 cm in size was uniformly precoated in each case with 148 g of frothed formulation.

This was followed by the application in each case of 60 g of frothed formulation as secondary coating. The textile backing (Action Bac polypropylene weave) was placed on top, worked in twice with a 1.6 kg heavy roller without pressure and dried in an oven at 130° C. for 20 minutes.

In Comparative Example 3, proportionately more formulation was applied on account of the lower solids content in order to obtain the same add-on after drying.

While the add-on for the secondary coating corresponds to the industrially customary amount, the add-on for the precoat is more than twice as high, in order to allow uniform distribution of the formulation on the carpet in the laboratory.

Measurement of Tuft Withdrawal Force:

Testing of the tuft withdrawal force was done in accordance with the ISO 4919 standard using a Zwick tester at 23° C. and 50% relative humidity. The laboratory carpet specimens were each clamped in the top part on the base of the measuring device and a needle was threaded into a carpet loop. The force needed to pull a loop out of the carpet was determined on 10 different carpet loops and the mean of the measured results was reported as the tuft withdrawal force.

The tuft withdrawal force in newtons [N] is a measure of the tuft bind provided by the precoat and of the wear properties of the carpet surface. The results are collated in Table 2.

Measurement of Delamination Resistance:

Delamination resistance was determined in accordance with DIN EN ISO 11857 using a Zwick tester at 23° C. and 50% relative humidity. Three samples of each laboratory carpet specimen were cut to a width of 5 cm and a length of 20 cm in the machine direction and delaminated by hand on the narrow side over a length of 5 cm. The incipiently delaminated sample was clamped into a Zwick tester and the secondary backing was separated from the carpet at a rate of 300 mm/min.

The mean value of the peaks was determined, ignoring the first 25% and the last 25% of the peaks and reporting the overall mean as the delamination resistance in newtons [N]. The results are collated in Table 2.

TABLE 2

| Dispersion | Tuft withdrawal force [N] | Delamination resistance [N] |
|---|---|---|
| Example 1 | 42.5 | 55.2 |
| Example 2 | 38.9 | 38.3 |
| Comparative Example 3 | 43.1 | 52.0 |
| Comparative Example 4 | 38.0 | 33.8 |
| Comparative Example 5 | 38.6 | 30.2 |

Summary and Interpretation of the Results:

Purely polyvinyl alcohol-stabilized vinyl acetate-ethylene dispersions (Comparative Example 3) generally display higher mechanical strengths, especially higher delamination resistances (see Table 2), but are not sufficiently filler-compatible (see Table 1).

The polyvinyl alcohol-stabilized vinyl acetate-ethylene copolymer dispersion of Example 1 exhibited not only high mechanical properties, in particular a high delamination resistance (Table 2), but also good filler compatibility (Table 1)

Subsequent admixture of PVOH (Example 2) likewise provides higher filler compatibility and good mechanical properties.

The additionally emulsifier-stabilized dispersion (Comparative Example 4) or the exclusively emulsifier-stabilized dispersion (Comparative Example 5), while exhibiting good filler compatibilities (Table 1), exhibit poor mechanical properties, in particular lower dry strengths (Table 2).

What is claimed is:

1. A carpet coating composition for consolidating carpets, which comprises an aqueous vinyl acetate-ethylene copolymer dispersion obtained via free-radically initiated emulsion polymerization, in an aqueous medium, of vinyl acetate and ethylene and optionally further ethylenically unsaturated comonomers, wherein the dispersion comprises a stabilizing system comprising from 5 to 10 wt %, based on total comonomers, of one or more partially hydrolyzed and low molecular weight polyvinyl alcohols having a hydrolysis degree of respectively 80 to 95 mol % and a Hoeppler viscosity, in 4% aqueous solution, of respectively 1 to 5 mPas (DIN 53015 Hoeppler method at 20° C.) and comprising from 100 to 1400 wt % of filler, based on 100 wt % of vinyl acetate-ethylene copolymer (solids/solids).

2. The carpet coating composition for consolidating carpets as claimed in claim 1, wherein from 65 to 99 wt % of vinyl acetate and from 1 to 30 wt % of ethylene and optionally up to 10 wt % of further comonomers are copolymerized.

3. The carpet coating composition for consolidating carpets as claimed in claim 1, wherein partially hydrolyzed and high molecular weight polyvinyl alcohols having a hydrolysis degree of 80 to 95 mol % and a Hoeppler viscosity in 4% aqueous solution of 8 to 40 mPas (DIN 53015 Hoeppler method at 20° C.) are employed in an amount of 0 to 2 wt %, based on total comonomers, in admixture with the partially hydrolyzed and low molecular weight polyvinyl alcohol.

4. The carpet coating composition for consolidating carpets as claimed in claim 1, wherein fully hydrolyzed and high molecular weight polyvinyl alcohols having a hydrolysis degree of 98 to 100 mol % and a Hoeppler viscosity in 4% aqueous solution of 10 to 56 mPas (DIN 53015 Hoeppler method at 20° C.) are employed in an amount of 0 to 2 wt %, based on total comonomers, in admixture with the partially hydrolyzed and low molecular weight polyvinyl alcohol.

5. The carpet coating composition for consolidating carpets as claimed in claim 1, wherein no emulsifiers are used during the polymerization nor are any emulsifiers admixed subsequently.

6. The carpet coating composition for consolidating carpets as claimed in claim 1, wherein the polyvinyl alcohol fraction is wholly included in the initial charge prior to the polymerization, or wholly added during the polymerization, or partly included in the initial charge and partly added, or the polyvinyl alcohol fraction is admixed partly before or during the polymerization and the balance is admixed subsequently after completion of the polymerization, subject to the proviso that in the latter case the proportion admixed before or during the polymerization is at least 2 wt %, based on total comonomers.

7. The carpet coating composition for consolidating carpets as claimed in claim 1 having a solids content of 72 to 83 wt %, based on the total weight of the carpet coating composition.

8. A carpet coated with a carpet coating composition as claimed in claim 1 in a precoat and/or secondary coating.

9. The carpet coating composition for consolidating carpets as claimed in claim 2, wherein partially hydrolyzed and high molecular weight polyvinyl alcohols having a hydrolysis degree of 80 to 95 mol % and a Hoeppler viscosity in 4% aqueous solution of 8 to 40 mPas (DIN 53015 Hoeppler method at 20° C.) are employed in an amount of 0 to 2 wt %, based on total comonomers, in admixture with the partially hydrolyzed and low molecular weight polyvinyl alcohol.

10. The carpet coating composition for consolidating carpets as claimed in claim 2, wherein fully hydrolyzed and high molecular weight polyvinyl alcohols having a hydrolysis degree of 98 to 100 mol % and a Hoeppler viscosity in 4% aqueous solution of 10 to 56 mPas (DIN 53015 Hoeppler method at 20° C.) are employed in an amount of 0 to 2 wt %, based on total comonomers, in admixture with the partially hydrolyzed and low molecular weight polyvinyl alcohol.

11. The carpet coating composition for consolidating carpets as claimed in claim 3, wherein fully hydrolyzed and high molecular weight polyvinyl alcohols having a hydrolysis degree of 98 to 100 mol % and a Hoeppler viscosity in 4% aqueous solution of 10 to 56 mPas (DIN 53015 Hoeppler method at 20° C.) are employed in an amount of 0 to 2 wt %, based on total comonomers, in admixture with the partially hydrolyzed and low molecular weight polyvinyl alcohol.

* * * * *